May 30, 1933.  F. RIESS ET AL  1,912,011
LIMITED TORQUE APPLIER
Filed May 7, 1931   4 Sheets-Sheet 1

Inventors
Frank Riess and
John F. Sloan,
By
Hood + Hahn.
Attorneys

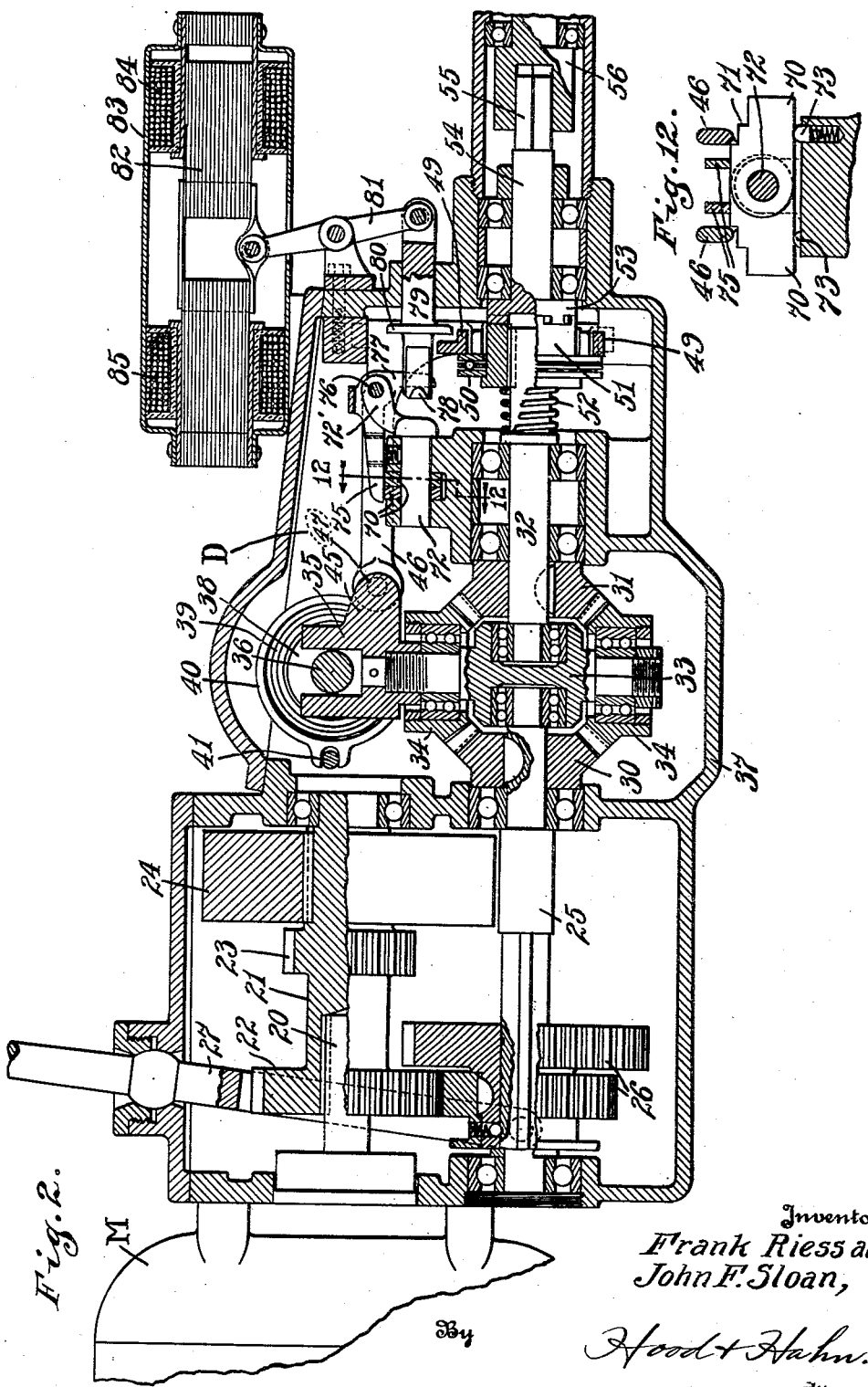

May 30, 1933.    F. RIESS ET AL    1,912,011
LIMITED TORQUE APPLIER
Filed May 7, 1931    4 Sheets-Sheet 3
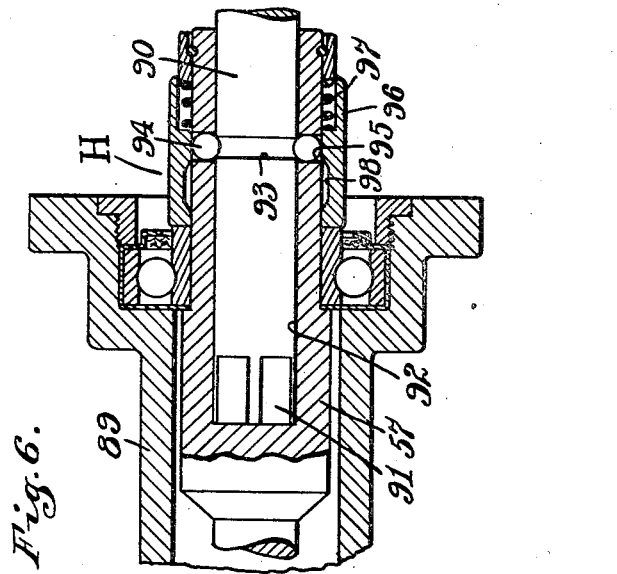
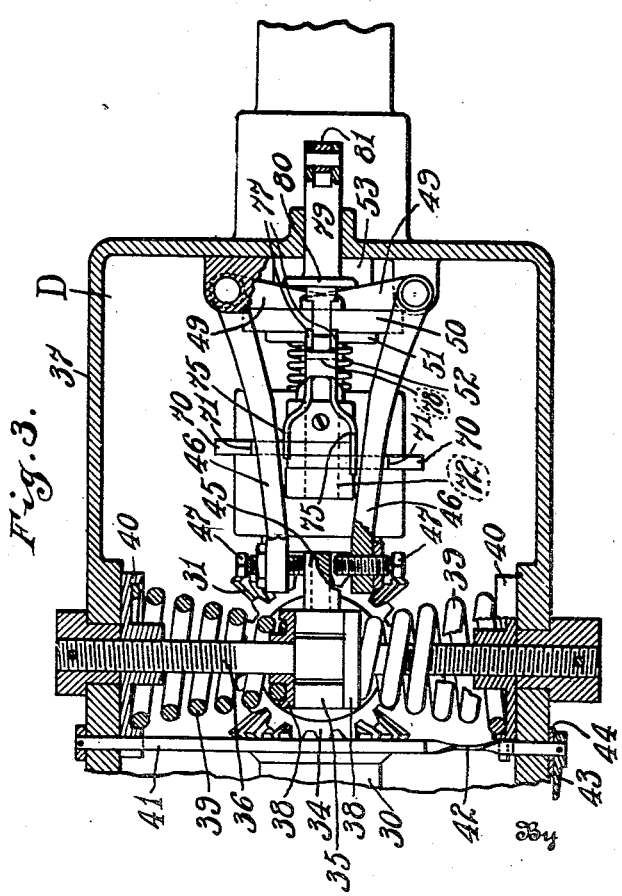
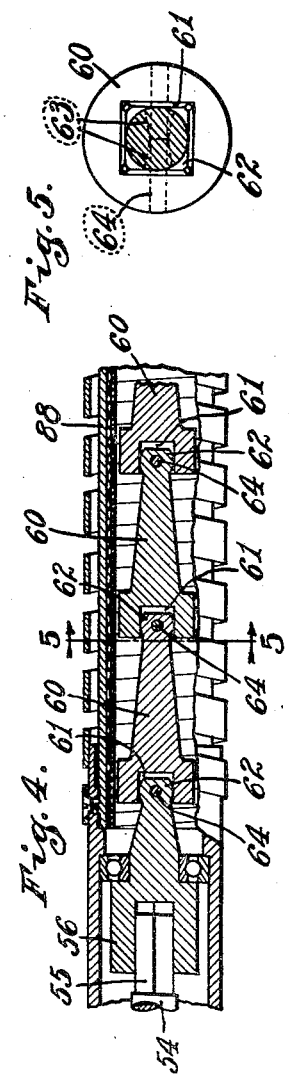
Inventors
Frank Riess and
John F. Sloan,
By
Hood & Hahn
Attorneys

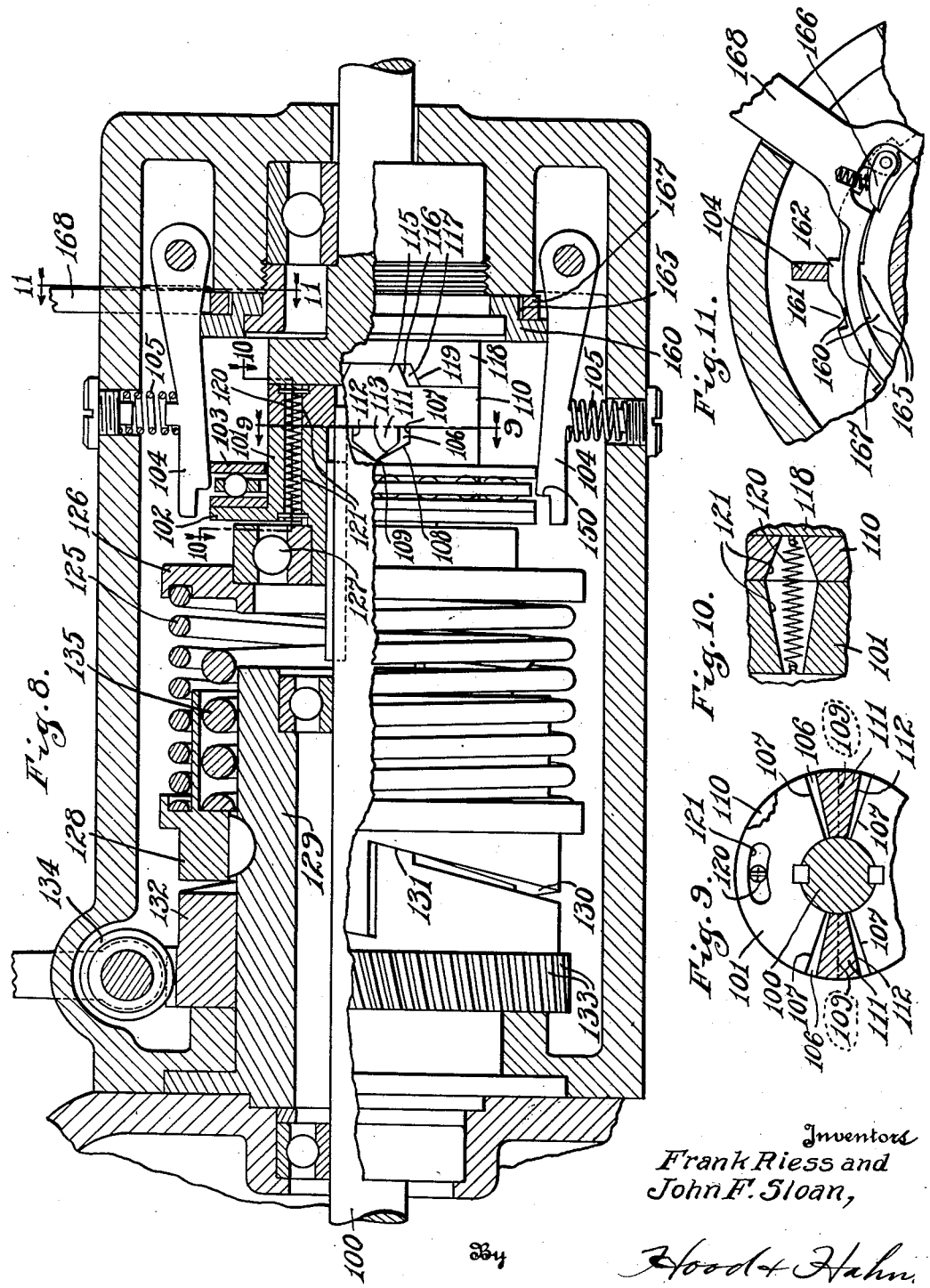

Patented May 30, 1933

1,912,011

UNITED STATES PATENT OFFICE

FRANK RIESS AND JOHN F. SLOAN, OF KOKOMO, INDIANA, ASSIGNORS TO RIESS EFFICIENCY TOOL COMPANY, OF STURGIS, MICHIGAN, A CORPORATION OF MICHIGAN

LIMITED TORQUE APPLIER

Application filed May 7, 1931. Serial No. 535,723.

The object of our invention is to provide means by which rotatable elements, such as screws, nuts, bolts, taps, drills, reamers, etc., may be rapidly rotated mechanically to a predetermined condition of resistance, whereupon the mechanical driving force will be automatically positively disconnected, the construction being such as to be under the easy control of the operator and such that the operator will not be tired by the jarring which has heretofore been generally characteristic of power-driven screw or nut drivers.

The accompanying drawings illustrate embodiments of our invention.

Figure 1:
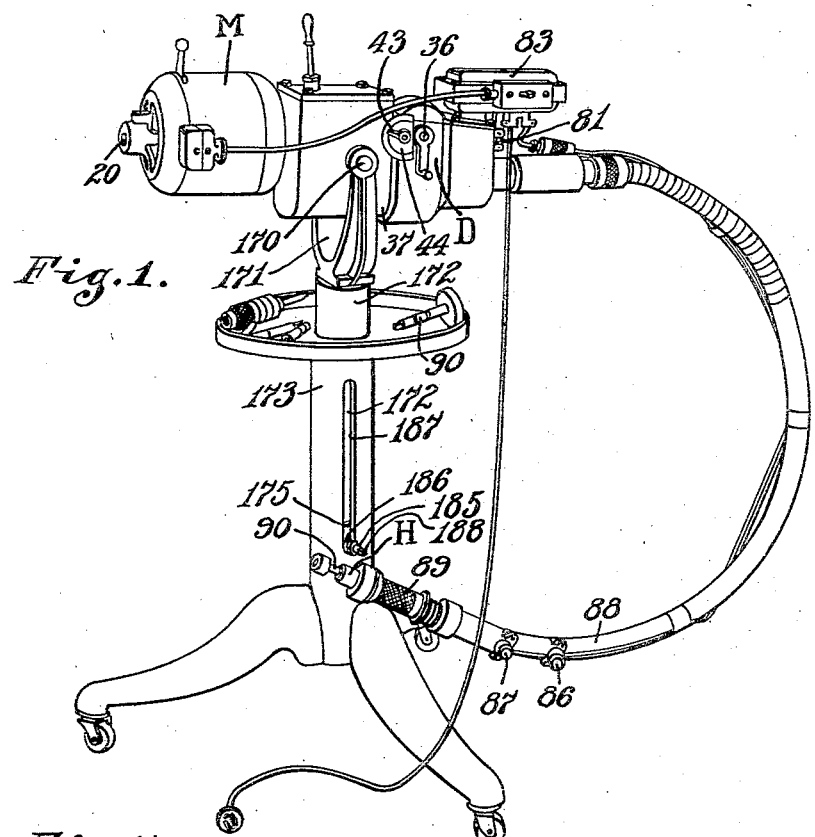
Figure 7:
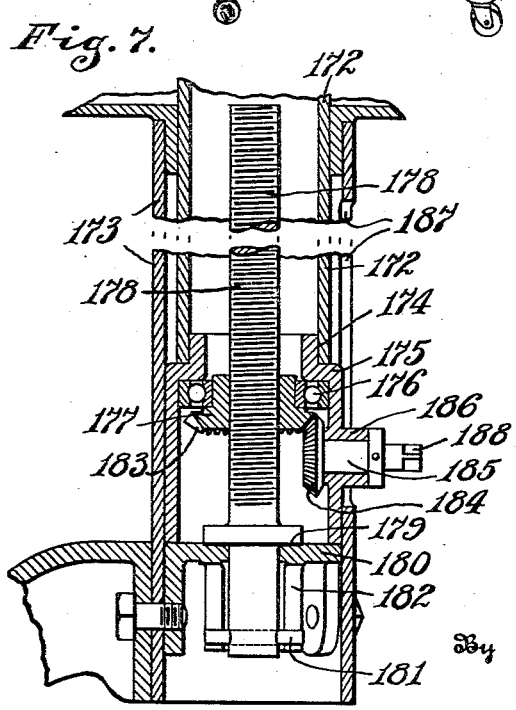

Fig. 1 is a perspective view of one embodiment of our invention;

Fig. 2 an axial section, on a scale larger than Fig. 1, of one embodiment of our improved automatic declutching mechanism;

Fig. 3 a fragmentary section of the declutching mechanism shown in Fig. 2, in a plane at right angles to the plane of Fig. 2;

Fig. 4 a fragmentary longitudinal section of a short portion of the flexible driving shaft conveniently useful in our apparatus;

Fig. 5 a section on line 5—5 of Fig. 4, but on an enlarged scale;

Fig. 6 a fragmentary axial section of the tool-receiving end of the flexible drive shaft;

Fig. 7 a fragmentary axial section of the pedestal and adjacent parts;

Fig. 8 an axial section of another form of declutching mechanism which may be substituted for the declutching mechanism shown in Fig. 2;

Fig. 9 a fragmentary section on line 9—9 of Fig. 8;

Fig. 10 a fragmentary section on line 10, 10 of Fig. 8;

Fig. 11 a fragmentary section on line 11, 11 of Fig. 8, and Fig. 12 a fragmentary section on line 12, 12 of Fig. 2.

The essential elements of our apparatus are a power source M, a rotative driving head H, an automatically-operating declutching mechanism D between the power source and the driving head, of such character that when the driving head meets a resistance of a predetermined amount, a definite and positive disconnection will be established in the driving train between the power source and the driving head, and preferably such that the parts may be readily adjusted so that the declutching action will occur at any resistance within the range of the apparatus.

Referring to Fig. 2.

The shaft 20 of motor M is keyed to a shaft 21 provided with gears 22 and 23 of different diameters and a fly wheel 24. This fly wheel is provided in order to relieve the motor M from the shock of sudden establishment of driving connection between the motor and driving head at times when said head is subject to the resistance offered by the article which is to be rotated. Paralleling shaft 20 is a jack shaft 25 upon which is splined a compound gear 26, adapted to be shifted into mesh with either gear 22 or gear 23, by a shift yoke 27. This speed-varying mechanism is not essential, but is a convenience for increasing the range of utility of the apparatus, and may be varied to suit the needs. We consider it quite important, however, to provide the fly wheel at all times associated with the motor.

Secured to the delivery end of shaft 25 is a bevel pinion 30 coaxial with bevel pinion 31 carried by shaft 32. Journaled upon the inner adjacent ends of shafts 25 and 32 is a block 33 upon which are journaled bevel pinions 34, 34 which mesh with gears 30 and 31. Block 33 carries a radially-projecting yoke 35 which straddles adjusting shaft 36 journaled in casing 37 and lying at right angles to the axis of shafts 25 and 32. The fingers of yoke 35 lie between spring-abutment collars 38, 38, slidably mounted on shaft 36 and each forming an abutment for a spring 39, the opposite end of each of said springs abutting against a collar 40 through which shaft 36 is threaded, the opposite ends of said shaft being oppositely threaded so that rotation of the shaft 36 will adjust the spring abutments 40, 40 toward and from each other to vary the effect of said springs in resistance to lateral movement of yoke 35. Rotation of collars 40, 40 is prevented by slidably interlocking them with an indicator shaft 41 which, in the portion traversed by one of the collars 40 is twisted or provided with a long-pitch thread, as indicated at 42 (Fig. 3), so that the position of adjustment of the collars 40, and consequently the amount of stress in the springs 39, may be conveniently indicated by an indicator finger 43 carried by the shaft 41 and traversing the indicator scale 44 (Fig. 1). Rotation of gear 30, in either direction, will tend to displace yoke 35 laterally in the corresponding direction, this tendency being resisted by one of the springs 39 so that, until corresponding rotation of gear 31 is sufficiently resisted, in excess of the resistance offered by the spring 39, there will be no lateral movement of yoke 35.

Yoke 35 carries a finger 45 which is flanked, on either side, by a clutch-retracting lever 46 provided with an adjustable temper screw 47 which directly coacts with finger 45. Each lever 46 is provided with an arm 49 arranged to engage, in retracting direction, a thrust bearing 50 carried by clutch member 51 splined upon the delivery end of shaft 32 and yieldingly urged toward clutching position by spring 52.

Arranged to coact with clutch member 51 is the companion clutch member 53 carried by a power delivery shaft 54 having a squared end 55 adapted to receive the properly socketed end 56 of a power delivery shaft, preferably of a flexible type as indicated in Figs. 4 and 5. We think it preferable that the flexible shaft be of the type which has no substantial yield circumferentially of the axis of rotation, in order to reduce possible lost motion in power transmission to the driving head 57 (Fig. 6) at the delivery end of the flexible shaft. The precise details of construction of the flexible shaft are not of great importance so far as the present invention is concerned. In Figs. 4 and 5 each of the shaft sections 60 is provided at one end with a polygonal pocket 61 and at the other end with a head 62 which may fit within the pocket of an adjacent shaft section 60, said head being correspondingly polygonal in transverse section and spherical in axial section. Each head 62 is transversely perforated at 63 by a perforation which is tapered inwardly both ways toward the center, as indicated in dotted lines in Fig. 5, and pin 64 passes through this perforation and is anchored in the adjacent section.

In order to catch and retain either throw-out lever 46 in clutch-retracting position, we provide two oppositely-extending latches 70 (Figs. 2, 3 and 12), each of which underlies one of the levers 46 and is provided with a lever-retaining shoulder 71. The two latches are pivoted upon a pin 72 and each latch is urged upwardly against the under face of its lever 46 by a spring plunger 73. In order to retract the latches 70, 70, I provide a fork 75 overlying the latches and pivoted at 76 on a finger 72' carried by pin 72. Fork 75 is provided with a depending finger 77 arranged to be engaged, in latch-retracting direction, by a bar 78 carried by a plunger 79, which plunger is provided with a collar 80 having a one-way engagement with the fingers 49 and levers 46, such that plunger 79 may be utilized to retract clutch element 51 from clutch element 53.

Plunger 79 may be manipulated by any desired means within convenient access of the operator. For this purpose we have provided a lever 81 connected to the core 82 of a solenoid 83 having oppositely-acting coils 84 and 85, energization of which may be controlled by switches 86 and 87 respectively, located at a point of convenient access on the sheath 88 of the flexible shaft adjacent the hand-hold 89, through which the tool-receiving head 57 is projected.

The tool or implement which is to be driven by the mechanism may be, as previously stated, a nut socket, screw driver, tap, drill, reamer, or what-not, having a shank 90 fitting within and having a polygonal association 91 with the socket 92 formed in head 57 and provided with a circumferential locking groove 93 into which may be projected the locking balls 94 located in radial pockets 95 in the wall of socket 92 and urged inwardly by the cam sleeve 96 axially away from the active end of the implement 90 by a spring 97, said sleeve 96 having an internal annular pocket 98 which, when brought opposite the balls 94, permit them to move outwardly so as to release shank 90. This arrangement is especially conducive to speed of withdrawal of the implement 90 because the operator, grasping sleeve 96 and moving his hand quickly outwardly (to the right in Fig. 6), may release the balls 94 and, before sleeve 96 can spring backwardly, his fingers may slip off of sleeve 96 to grasp shank 90 and retract it before balls 94 can be returned to interlocking relation with the shank 90.

In operation, the motor M being in motion and clutch element 51 being separated from clutch element 53 and held in its separated position by the coaction of latches 70 with levers 46, the implement 90 will be applied to the article which is to be rotated and the operator, by pressing switch 87 causes a shifting of core 82 of solenoid 83 toward the left to the position shown in Fig. 2, thereby retracting latches 70 and permitting spring 52 to shift clutch element 51 into circumferential interlocking relationship with clutch member 53, whereupon implement 90 is rotated until the predetermined resistance is reached, whereupon yoke 35 will be shifted to one side or the other, depending upon the direction of rotation of the motor, to overcome the adjacent spring 39, thus shifting the appropriate lever 46 to cause positive retraction of clutch element 51 from clutch element 53, where it is held by the action of one of the latches 70 upon the displaced lever 46, whereupon rotation of implement 90 stops. The upward movement of the active latch 70 acting through fork 75, finger 77 and plunger 79 and lever 81, shifts core 82 to the right in Fig. 2. The implement 90 is then applied to another article which is to be rotated, the operator again energizes the solenoid to shift it to the position shown in Fig. 2 and the operation is repeated.

The fundamental characteristic of the mechanism shown in Fig. 3 is that, whenever the driving head of the apparatus meets a predetermined resistance, a positive disconnection is automatically produced between the constantly running motor and the driving head 57.

It will be readily understood that mechanisms of quite radically different form may be produced wherein there is the same general coaction, i. e., a predetermined resistance to rotative movement of the delivery element of the clutch pair will produce, against the predetermined resistance of an abutment spring, a positive retraction of the receiving element of the clutch pair to a point where it may be locked out of coactive relationship with the delivery element of the clutch pair.

In Fig. 8 we show such a mechanism. In this construction the power-receiving shaft 100 is driven by the motor and has splined thereon the collar 101 having a flange 102 against which abuts a thrust bearing 103 which is overlaid by latches 104, each of which is urged inwardly by a spring 105. The illustration of the thrust bearing is diagrammatic in character in order that the drawing may be as simple as possible. Collar 101 is provided at diametrically opposite points with pockets 106 having side walls 107 parallel, or substantially parallel with, the axis of shaft 100 and inner end walls 108 which are inclined toward each other and meet at the apex 109. Sleeved upon the end of shaft 100 and capable of limited movement thereon both axially and circumferentially is the power-receiving clutch element 110 which is annular and provided on one radial face with three lugs 111. The height of these lugs is equal to the maximum axial dimension of pocket 106 and its width is somewhat less than the angular extent (width) of pocket 106, said lugs having side surfaces 112 which are parallel or substantially parallel with the axis of shaft 100 and adapted to be engaged by the side walls 107 of pocket 106 when there is a limited angular displacement of ring 110 relative to collar 101. The tip of lug 111 is formed by the converging surfaces 113 which preferably converge at a slightly sharper angle than the angle of convergence of the surface 108. The opposite face of ring 110 is provided with axially-extended lugs 115, the side walls 116 of which converge. Each lug 115 is adapted to lie within a pocket 117 of the power delivery clutch element 118, said pocket having a depth equal to the axial extent of lug 115 and having an angular extent greater than the angular extent of the lug 115. The side walls 119 of pocket 117 lie at the same angle to the general axis of the structure as do surfaces 116 and this angle is such that, under sufficient circumferential force, the surfaces 116 may slip axially on surfaces 119.

The power delivery clutch element 118 is held against axial movement in suitable bearings and the power-receiving clutch element 110 is tied to the collar 101 by several tension springs 120 each mounted in a pocket 121 formed in the collar 101 and ring 110, as indicated in Figs. 8 and 10, the arrangement being such that ring 110 may have a limited rotative and a limited axial movement relative to collar 101 while being at all times urged axially toward collar 101 by the action of springs 120.

Collar 101, and its associated clutch element ring 110, is yieldingly urged to the axial position shown in Fig. 8 by a spring 125 abutting a ring 126, which acts through a thrust bearing 127 upon collar 101 and this spring 125 at its other end engages an axially-adjustable abutment 128 splined upon the fixed sleeve 129 and provided with cam surfaces 130 resting upon cam surfaces 131 of an angularly-adjustable collar 132 provided with worm teeth 133 engaged by a worm 134. Angular adjustment of ring 132, by rotation of the worm 134, will, by axially shifting abutment 128, predetermine the effective force of spring 125 upon collar 101. In order to increase the range of effectiveness of the apparatus spring 125 may, in certain positions of adjustment of abutment 128, be supplemented by a spring 135 which will come into engagement with ring 126 when spring 125 is sufficiently compressed.

Latches 103 are provided with shoulders 150 which may drop down behind thrust bearing 103 when it is sufficiently displaced toward the left to retain collar 101 in axially displaced position. The operation is as follows:

Rotative force being applied to shaft 100 the rear walls 107 of pockets 106 will move toward the rear walls 112 of lugs 111, the apices of lugs 111 sliding upon the rearward surfaces 108 and thus displacing collar 101 axially toward the left against the action of spring 125 an amount, determined by the inclination of surfaces 108 and the circumferential extent of pocket 106. The collar 101 will thus be advanced angularly relative to ring 110 and a gap will be formed between the end of collar 101 and the adjacent end of ring 110, whereupon the forward surface 116 of lug 115 will be advanced into contact with the forward surface 119 of pocket 117. Further rotative advance of shaft 100 will advance the clutch element 118 until it meets with a resistance which is sufficient to permit surface 116 to slide axially upon surface 119, against the action of spring 125, until lug 115 is retracted from the pocket, its tip tending to slide upon the left hand radial surface of element 118. At this moment the thrust bearing 103 will have been displaced to the left sufficiently to permit shoulders 150 of latches 104 to drop in behind the thrust bearing. The forward angular advance of ring 110, under the influence of springs 120, will cause a further axial movement of said ring 110 as the tips of lugs 111 slide down into the apex 109 of pocket 106 so that the tips of the clutch teeth 115 will be definitely retracted from the adjacent radial surface of the clutch element 118, thus producing a definite separation of the two clutch elements.

The latches 104 overlie a cam ring 160 having notches 161 and cam lugs 162, the arrangement being such that successive rotative advancements of ring 160 will successively retract and release latches 104 relative to the thrust bearing 103. The cam ring 160 is provided with a plurality of ratchet teeth 165 each capable of advancing ring 160 a distance between two adjacent notches 161, thus sweeping cams 162 beneath the latches to carry them to releasing position and then free them. These teeth may be engaged by a pawl 166 carried by an oscillating ring 167 and having an arm 168 by which it may be manipulated either manually or by some distant control, as for instance a double-action solenoid similar to that shown in Fig. 2.

The operation is as follows:

Shaft 100 being in rotation and collar 101 being held in retracted position by latches 104, the clutch element 110 rotates freely entirely clear from clutch-element 118, the tips of lugs 111 lying in the spaces formed by the surfaces 108. An advancement of cam ring 160 through the position shown in Fig. 11, to sweep cams 162 beneath and beyond latches 104, the latches are retracted so as to permit spring 125 to shift collar 101 and its associated clutch ring 110 to the right where, upon registry of lugs 115 with pockets 117, said lugs may drop into said pockets to produce a driving connection between shaft 110 and the clutch element 118, whereupon, upon the exertion of sufficient resistance to rotation of element 118, an automatic retraction of lugs 115 from pockets 117 may be obtained as already described.

For convenience in manipulating the apparatus it is substantially balanced about the horizontal axis 170 in a yoke 171 carried by a hollow stem 172 rotatably mounted in the tubular stem 173 of a suitable pedestal.

Stem 172 is rotatably supported at 174 upon a shell 175 supported by bearings 176 upon a nut 177 threaded upon screw 178 seated at 179 on the floor 180 of the pedestal. Rotation of screw 178 is prevented by cross pins 181 projected between depending fingers 182. Nut 177 is provided with gear teeth 183 meshing with pinion 184 carried by shaft 185 journaled in a boss 186 carried by shell 175 and projected outwardly through a vertical slot 187 in the stem 173 of the pedestal. The outer end of shaft 185 is squared at 188 to receive a suitable wrench such for instance as one of the suitable socketed implements 90 adapted to be driven by the head 57, the arrangement being such that yoke 171 may be vertically adjustable, while at all times free to rotate about a vertical axis and, when the yoke reaches its lowest position, screw 178 will be free to rise from its supporting floor in case of excess rotation of shaft 185 producing descent of nut 177.

What we claim is:

1. A torque-applier comprising a rotatable power-receiving element, a rotatable power-delivery element, a pair of mating clutch members interposed between the power-receiving and power-delivery elements and one separable from the other, yielding means biasing said movable clutch member into engagement with its fellow, means responsive to resistance offered by the power-delivery element to positivly separate the movable clutch member from its fellow to a position non-contactible by said fellow, latching means to retain the movable clutch means in a non-contactible inactive position, and means by which the latching means may be retracted.

2. A torque-applier comprising a rotatable power-receiving element, a rotatable power-delivery element, a pair of mating clutch members interposed between the power-receiving and power-delivery elements and one separable from the other, a differential-gear train interposed between the power-receiving element and the clutch members, two opposed yielding abutments for the carrier of the intermediate gear of said differential, means responsive to displacement of said carrier in either direction in opposition to one of its abutments, to separate the movable clutch member from its fellow, yielding means biasing said movable clutch member into engagement with its fellow, latching means to retain the movable clutch means in its inactive position, and means by which the latching means may be retracted.

3. A torque-applier comprising a rotatable power-receiving element, a rotatable power-delivery element, a pair of mating clutch members interposed between the power-receiving and power-delivery elements and one separable from the other, a differential-gear-train interposed between the power-receiving element and the clutch members, a continuously-acting yielding abutment for the carrier of the intermediate gear of said differential, means, responsive to displacement of said carrier in opposition to its abutment, to separate the movable clutch member from its fellow, yielding means biasing the separable clutch member toward its fellow, latching means to retain the movable clutch member in its retracted position, and means by which said latching means may be retracted.

4. A torque-applier comprising, a rotatable power-receiving element, a rotatable power-delivery element, a pair of mating clutch members interposed between the power-receiving and power-delivery elements and one separable from the other, a differential-gear-train interposed between the power-receiving element and the clutch members, a continuously-acting yielding abutment for the carrier of the intermediate gear of said differential, means by which the effective resistance of said abutment may be adjusted, means, responsive to displacement of said carrier in opposition to its abutment, to separate the movable clutch member from its fellow, yielding means biasing the separable clutch member toward its fellow, latching means to retain the movable clutch member in its retracted position, and means by which said latching means may be retracted.

5. A torque-applier comprising, a rotatable power-receiving element, a rotatable power-delivery element, a pair of mating clutch members interposed between the power-receiving and power-delivery elements and one separable from the other, a differential-gear-train interposed between the power-receiving element and the clutch members, two oppositely-acting yielding abutments for the carrier of the intermediate gear of said differential, means, responsive to displacement of said carrier in opposition to either of its abutments, to separate the movable clutch member from its fellow, yielding means biasing the separable clutch toward its fellow, latching means to retain the movable clutch member in its retracted position, and means by which said latching means may be retracted.

6. A torque-applier comprising, a rotatable power-receiving element, a rotatable power-delivery element, a pair of mating clutch members interposed between the power-receiving and power-delivery elements and one separable from the other, a differential-gear train interposed between the power-receiving element and the clutch members, two oppositely-acting yielding abutments for the carrier of the intermediate gear of said differential, means by which the effective resistances of said abutments may be adjusted, means, responsive to displacement of said carrier in opposition to either of its abutments, to separate the movable clutch member from its fellow, yielding means biasing the separable clutch member toward its fellow, latching means to retain the movable clutch member in its retracted position, and means by which said latching means may be retracted.

7. A torque-applier comprising a rotatable power-receiving element, a rotatable power-delivery element, a driving connection between the power-receiving and power-delivery elements comprising a pair of mating clutch members one separable from the other and also comprising means permitting advancement of the power-receiving element relative to the power-delivery element when resistance to advancement of the power-delivery element rises to a predetermined value, means responsive to such relative movement to retract the movable clutch member from its fellow to a position noncontactible thereby, yielding means biasing the movable clutch member into engagement with its fellow, latching means for latching said movable clutch member in retracted non-contactible position, and means by which said latching means may be retracted.

8. A torque-applier comprising a rotatable power-receiving element, a rotatable power-delivery element, a pair of mating clutch members interposed between said elements and one separable from the other, yielding means biasing the separable clutch member toward its fellow, a differential-gear-train interposed between the power-receiving and power-delivery elements, a yielding abutment for the carrier of the intermediate gear of said differential, means, responsive to displacement of said carrier in opposition to its abutment, to separate the movable clutch member from its fellow, latching means to retain the movable clutch member in its retracted position, and means by which said latching means may be retracted.

9. A torque-applier comprising a rotatable power-receiving element, a rotatable power-delivery element, a pair of mating clutch members interposed between said elements and one separable from the other, yielding means biasing the separable clutch member toward its fellow, a differential-gear-train interposed between the power-receiving and power-delivery elements, a yielding abutment for the carrier of the intermediate gear of said differential, means by which the effective resistance of said abutment may be adjusted, means, responsive to displacement of said carrier in opposition to its abutment, to separate the movable clutch member from its fellow, latching means to retain the movable clutch member in its retracted position, and means by which said latching means may be retracted.

10. A torque-applier comprising a power-receiving shaft, a power-delivery shaft, a differential gear train connecting said shafts, a continuously-acting yielding abutment for yieldingly obstructing movement of the carrier of the intermediate gear of the differential in one direction, a clutch-shifting lever arranged to be shifted by said carrier, a second power-delivery shaft, two mating clutch members interposed between the two power-delivery shafts and one separable from the other, said separable clutch member arranged to be engaged in separation direction by the clutch-shifting lever, means for yieldingly biasing the separable clutch member toward its fellow, latching means cooperating with the clutch-shifting lever to retain the movable clutch member in separated position, and means by which said latching means may be retracted.

11. A torque-applier comprising a power-receiving shaft, a power-delivery shaft, a differential gear train connecting said shafts, a yielding abutment for yieldingly obstructing movement of the carrier of the intermediate gear of the differential in one direction, means by which the effective resistance of said abutment may be modified, a clutch-shifting lever arranged to be shifted by said carrier, a second power-delivery shaft, two mating clutch members interposed between the two power-delivery shafts and one separable from the other, said separable clutch member arranged to be engaged in separation direction by the clutch shifting lever, means for yieldingly biasing the separable clutch member toward its fellow, latching means cooperating with the clutch-shifting lever to retain the movable clutch member in separated position, and means by which said latching means may be retracted.

12. A torque-applier comprising a power-receiving shaft, a power-delivery shaft, a differential-gear-train connecting said shafts, two opposed yielding abutments acting upon the intermediate gear carrier of the differential to normally hold it in intermediate position, two clutch-shifting levers flanking said carrier, a second power-delivery shaft, two mating clutch members interposed between the two power-delivery shafts, one being separable from the other and arranged within the influence of the two clutch-shifting levers, means for biasing the movable clutch member toward its fellow, latching means cooperating with said clutch-shifting levers to retain the movable clutch member in retracted position, and means by which the latching means may be retracted.

13. A torque-applier comprising a power-receiving shaft, a power-delivery shaft, a differential-gear-train connecting said shafts, two opposed yielding abutments acting upon the intermediate gear carrier of the differential to normally hold it in intermediate position, means by which the effective resistance of said yielding abutments may be varied, two clutch-shifting levers flanking said carrier, a second power-delivery shaft, two mating clutch members interposed between the two power-delivery shafts, one being separable from the other and arranged within the influence of the two clutch-shifting levers, means for biasing the movable clutch member toward its fellow, latching means cooperating with said clutch-shifting levers to retain the movable clutch member in retracted position, and means by which the latching means may be retracted.

14. A torque-applier comprising a rotatable power-receiving element, a rotatable power-delivery element, a pair of mating clutch members interposed between the power-receiving and power-delivery elements and one separable from the other, yielding means biasing said movable clutch member into engagement with its fellow, means responsive to resistance offered by the power-delivery element to positively separate the movable clutch member from its fellow to a position noncontactible by said fellow, latching means to retain the movable clutch means in its inactive noncontactible position, and means by which the latching means may be retracted, and a fly wheel associated with the power-receiving shaft.

15. A torque-applier comprising a rotatable power-receiving element, a rotatable power-delivery element, a pair of mating clutch members interposed between the power-receiving and power-delivery elements and one separable from the other, a differential-gear-train interposed between the power-receiving element and the clutch members, a continuously-acting yielding abutment for the carrier of the intermediate gear of said differential, means responsive to displacement of said carrier in opposition to its abutment, to separate the movable clutch member from its fellow, yielding means biasing the separable clutch member toward its fellow, latching means to retain the movable clutch member in its retracted position, means by which said latching means may be retracted, and a fly wheel associated with the power-receiving shaft.

16. A torque-applier comprising, a rotatable power-receiving element, a rotatable power-delivery element, a pair of mating clutch members interposed between the power-receiving and power-delivery elements and one separable from the other, a differential-gear-train interposed between the power-receiving element and the clutch members, two oppositely-acting yielding abutments for the carrier of the intermediate gear of said differential, means, responsive to displacement of said carrier in opposition to either of its abutments, to separate the movable clutch member from its fellow, yielding means biasing the separable clutch toward its fellow, latching means to retain the movable clutch member in its retracted position, means by which said latching means may be retracted, and a fly wheel associated with the power-receiving shaft.

17. A torque-applier comprising a rotatable power-receiving element, a rotatable power-delivery element, a driving connection between the power-receiving and power-delivery elements comprising a pair of mating clutch members one separable from the other and also comprising means permitting advancement of the power-receiving element relative to the power-delivery element when resistance to advancement of the power-delivery element rises to a predetermined value, means responsive to such relative movement to retract the movable clutch member from its fellow to a position non-contactible thereby, yielding means biasing the movable clutch member into engagement with its fellow, latching means for latching said movable clutch member in retracted non-contactible position, means by which said latching means may be retracted, and a fly wheel associated with the power-receiving shaft.

18. A torque-applier comprising a rotatable power-receiving element, a rotatable power-delivery element, a pair of mating clutch members interposed between said elements and one separable from the other, yielding means biasing the separable clutch member toward its fellow, a differential-gear-train interposed between the power-receiving and power-delivery elements, a continuously-acting yielding abutment for the carrier of the intermediate gear of said differential, means, responsive to displacement of said carrier in opposition to its abutment, to separate the movable clutch member from its fellow, latching means to retain the movable clutch member in its retracted position, means by which said latching means may be retracted, and a fly-wheel associated with the power-receiving shaft.

19. A torque-applier comprising a power-receiving shaft, a power-delivery shaft, a differential gear train connecting said shafts, a yielding abutment for yieldingly obstructing movement of the carrier of the intermediate gear of the differential in one direction, a clutch-shifting lever arranged to shift the said carrier, a second power-delivery shaft, two mating clutch members interposed between the two-power delivery shafts and one separable from the other, said separable clutch member arranged to be engaged in separate direction by the clutch-shifting lever, means for yieldingly biasing the separable clutch member toward its fellow, latching means cooperating with the clutch-shifting lever to retain the movable clutch member in separated position, means by which said latching means may be retracted, and a fly wheel associated with the power-receiving shaft.

20. A torque-applier comprising a power-receiving shaft, a power-delivery shaft, a differential-gear-train connecting said shafts, two opposed yielding abutments acting upon the intermediate gear carrier of the differential to normally hold it in intermediate position, two clutch-shifting levers flanking said carrier, a second power-delivery shaft, two mating clutch members interposed between the two power-delivery shafts, one being separable from the other and arranged within the influence of the two clutch-shifting levers, means for biasing the movable clutch member toward its fellow, latching means cooperating with said clutch-shifting levers to retain the movable clutch member in retracted position, means by which the latching means may be retracted, and a fly wheel associated with the power-receiving shaft.

21. A torque-applier comprising a power-receiving shaft, a clutch collar splined thereon and provided with a cam pocket, a clutch ring associated with said clutch collar and axially and angularly shiftable relative to said shaft, a cam finger carried by said clutch ring and projected into the cam pocket of the clutch collar, said cam finger and cam pocket coacting to limit angular displacement of the clutch ring relative to the clutch collar and to produce relative axial movement of the collar and ring, resilient means tying the clutch ring to the clutch collar, a power delivery shaft, a clutch member carried by said power-delivery shaft, said clutch member and clutch ring having mating angularly-interlocking axially-slippable engaging surfaces so placed that angular advancement of the ring relative to the clutch member will cause axial movement of the ring and its associated collar tending to separate the ring from the clutch member, yielding means biasing the clutch collar and its associated clutch ring toward the clutch member carried by the power-delivery shaft, latching means arranged to retain the clutch collar in displaced position, and means by which said latching means may be retracted.

22. A torque-applier comprising a power-receiving shaft, a clutch collar splined thereon and provided with a cam pocket, a clutch ring associated with said clutch collar and axially and angularly shiftable relative to said shaft, a cam finger carried by said clutch ring and projected into the cam pocket of the clutch collar, said cam finger and cam pocket coacting to limit angular displacement of the clutch ring relative to the clutch collar and to produce relative axial movement of the collar and ring, resilient means tying the clutch ring to the clutch collar, a power-delivery shaft, a clutch member carried by said power-delivery shaft, said clutch member and clutch ring having mating angularly-interlocking axially-slipable engaging surfaces so placed that angular advancement of the ring relative to the clutch member will cause axial movement of the ring and its associated collar tending to separate the ring from the clutch member, yielding means biasing the clutch collar and its associated clutch ring toward the clutch member carried by the power-delivery shaft, an adjustable abutment by means of which the effective resistance of said biasing means may be varied, latching means arranged to retain the clutch collar in displaced position, and means by which said latching means may be retracted.

In witness whereof, we have hereunto set our hands at Sturgis, Michigan, this first day of May, A. D. one thousand nine hundred and thirty-one.

FRANK RIESS.
JOHN F. SLOAN.